United States Patent [19]

Kraus

[11] 4,440,043
[45] Apr. 3, 1984

[54] FIXED RATIO TRACTION ROLLER TRANSMISSION WITH TAPERED LOADING MEANS

[75] Inventor: Charles E. Kraus, Austin, Tex.

[73] Assignee: Excelermatic Inc., Austin, Tex.

[21] Appl. No.: 354,371

[22] Filed: Mar. 3, 1982

[51] Int. Cl.³ ............... F16H 13/06; F16H 15/00; F16H 13/02; F16H 13/00
[52] U.S. Cl. ................ 74/798; 74/202; 74/206; 74/208
[58] Field of Search ........... 74/796, 798, 208, 202, 74/206; 403/372, 371, 370, 368

[56] References Cited

U.S. PATENT DOCUMENTS

| | | | |
|---|---|---|---|
| 757,014 | 4/1904 | Berglund et al. | 74/208 |
| 2,356,835 | 8/1944 | Duckett | 403/372 |
| 4,052,915 | 10/1977 | Kraus | 74/798 |
| 4,215,595 | 8/1980 | Kraus | 74/208 |
| 4,258,589 | 3/1981 | Mitchell | 74/796 |
| 4,338,036 | 7/1982 | De Leu | 403/371 |
| 4,349,050 | 9/1982 | Bergstrom et al. | 403/372 |

FOREIGN PATENT DOCUMENTS

| | | | |
|---|---|---|---|
| 6297 | 1/1924 | Denmark | 74/796 |
| 20937 | of 1907 | United Kingdom | 74/798 |
| 19649 | of 1913 | United Kingdom | 74/798 |
| 349137 | 5/1931 | United Kingdom | 74/798 |
| 2073364 | 10/1981 | United Kingdom | 74/208 |

Primary Examiner—Lawrence J. Staab
Assistant Examiner—Michael David Bednarek
Attorney, Agent, or Firm—Klaus J. Bach

[57] ABSTRACT

In a traction roller transmission in which traction rollers are rotatably supported in the annular space between concentric sun roller and traction ring structures, at least one of said sun roller and traction ring structures has a tapered support surface with a tightly wound coil spring having a tapered surface supported on said tapered support surface and an opposite cylindrical surface in engagement with said traction rollers and means are associated with said transmission for forcing the coil spring onto said tapered surface so as to cause firm engagement of the traction rollers with the sun roller and traction ring structures.

6 Claims, 3 Drawing Figures

FIXED RATIO TRACTION ROLLER TRANSMISSION WITH TAPERED LOADING MEANS

BACKGROUND OF THE INVENTION

The invention relates to fixed ratio traction roller transmissions with adjustable contact forces applied to the traction surfaces of the transmission.

Traction roller transmissions require relatively large engagement forces between their traction surfaces to prevent slippage. Various means for applying such contact forces are shown in "Mechanical Designs and Systems" Handbook, pages 14-8 and 14-9, McGraw-Hill, New York, 1964. Among other arrangements, there are shown in FIGS. 14.6 and 14.7 planetary-type traction roller transmissions wherein the outer rings are slightly undersized to compress the roller arrangements therein in order to provide the required contact forces. While these arrangements are quite simple, they are capable of providing the same constant traction force independent of the need, that is, independent of the torque transmitted through the transmission, and they provide the same losses no matter whether the full or only a small amount of power is transmitted. There are, however, applications where these characteristics are quite acceptable. A transmission for a small aircraft engine for example would be exposed to a relatively constant load. Cruise load and take-off load do not differ very much and the engine is run only very little under idle load where the losses would be relatively high.

However, such transmissions are difficult to manufacture and to assemble. Heating an undersized ring for assembly may be possible for relatively small transmissions but not for larger transmissions. In any case, such transmissions require the greatest manufacturing accuracies in order to arrive at the desired loading. Besides, slight wear after some time of use reduces the contact forces and this may result in slippage and rapid wear.

SUMMARY OF THE INVENTION

In order to overcome these disadvantages, a traction roller transmission with traction rollers supported in the annular space between concentric sun roller and traction ring structures is provided wherein at least one of the sun roller and traction ring structures has a tapered support surface with a tightly wound coil spring tapered at one side and supported on said support surface and having the opposite, cylindrical surface in contact with the traction rollers, and wherein means are provided for forcing the coil spring onto the tapered support surface to cause firm engagement of the traction rollers with the sun roller and traction ring structures.

DESCRIPTION OF THE PREFERRED EMBODIMENT

Figure 1:
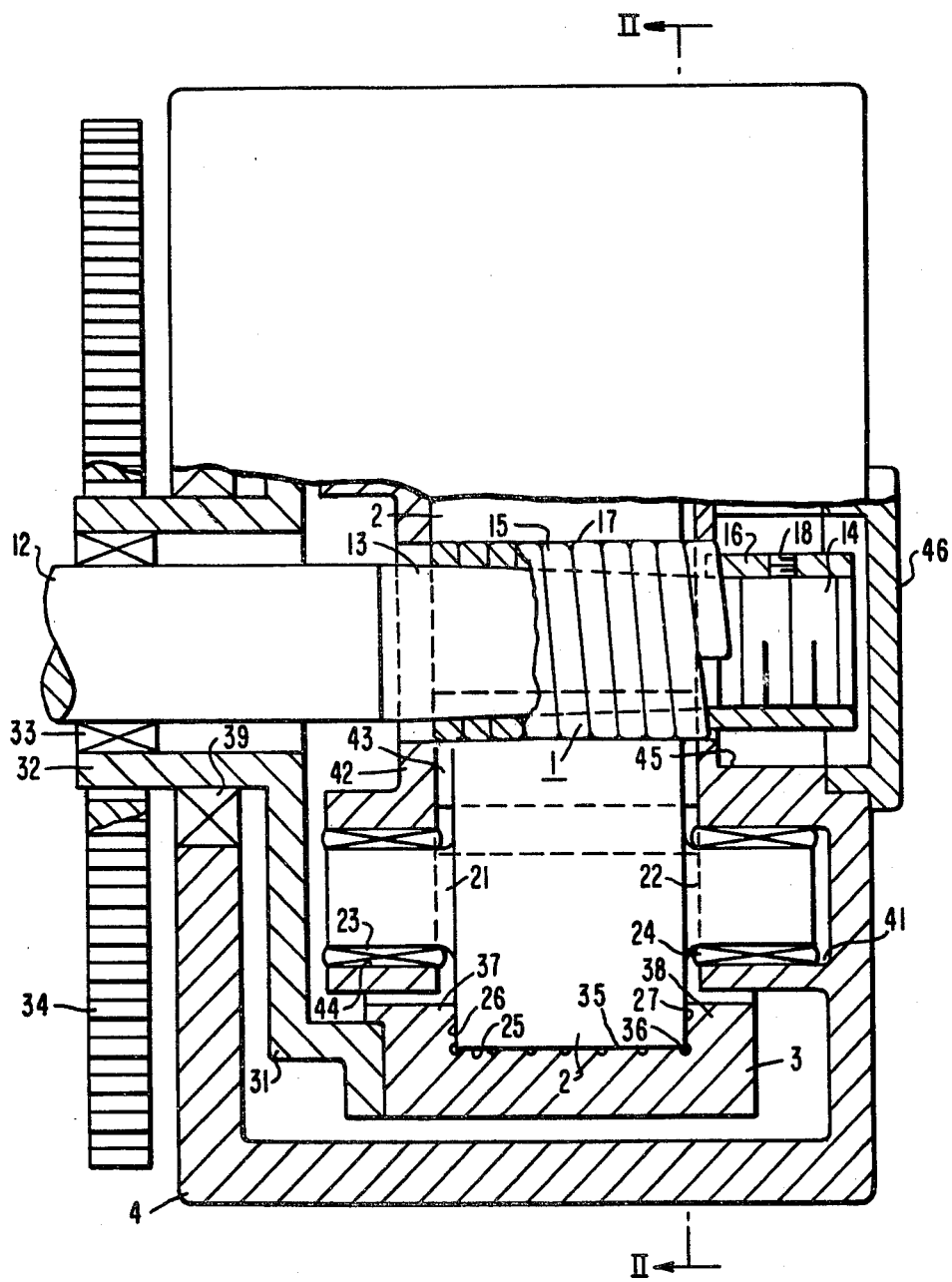
FIG. 1 is an axial cross-sectional view of one embodiment of a traction roller transmission incorporating the invention.
Figure 2:
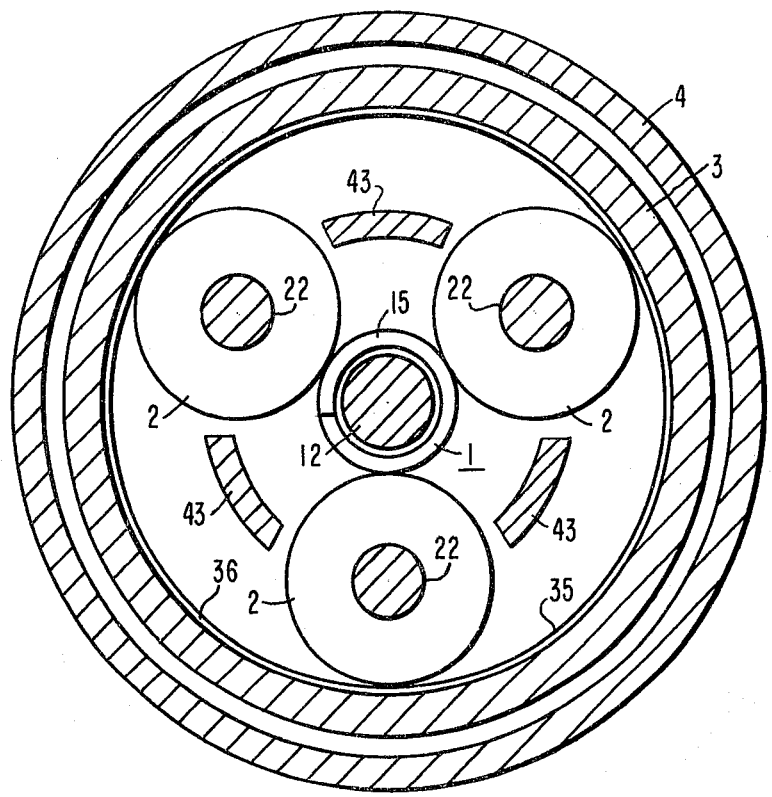
FIG. 2 is a cross-sectional view along line II—II of FIG. 1.

A planetary-type traction roller transmission as shown in FIGS. 1 and 2 consists basically of a sun roller structure 1 centrally disposed within a traction ring 3 with traction rollers 2 arranged in the annular space between the sun roller structure 1 and the ring 3, the arrangement being disposed within a housing 4.

The sun roller structure 1 has an input shaft 12 associated therewith which input shaft 12 has a tapered-core front portion 13 with a threaded end section 14. The tapered-core front portion 13 of the input shaft 12 carries a tightly wound spring 15 of essentially rectangular cross-section machined on the inside to fit over the tapered-core front portion 13 of the input shaft 12. A nut 16 is threaded onto the threaded end section 14 in order to permit the spring 15 to be pushed onto the tapered front portion 13 of the input shaft 12. The outer surface of the spring 15 forms the cylindrical traction surface 17 whose diameter is adjustable depending on the axial position of the spring 15 on the tapered front portion 13. The adjustment nut 16 is provided with a set screw 18 for locking the nut 16 in any adjustment position.

As shown in FIG. 2, there are three traction rollers 2 arranged in the annular space between the traction ring 3 and the sun roller structure 1, although more traction rollers may be used. The traction rollers 2 have trunnions 21 and 22 with which they are rotatably supported in the housing 4 by bearings 23 and 24. The traction surfaces 25 are smooth, hard surfaces for long wear. The rollers 2 also have smooth, flat side surfaces 26 and 27 for guidance by the traction ring structure 3 with which they are in engagement.

The traction ring structure 3 is mounted on a support flange 31 associated with an output shaft 32 which is rotatably supported on the input shaft 12 by a bearing 33 and carries a power output member such as an output gear 34. The inner traction surfaces 35 of the traction ring 3 are provided with annular grooves 36 adapted to receive lubricant squeezed by the rollers 2 from the areas of contact with the traction surfaces 35. The traction ring 3 also has inwardly projecting flange portions 37 and 38 which receive therebetween the traction rollers 2 for guidance thereof. The traction ring structure 3 is supported within the housing 4 by means of bearing 39 surrounding output shaft 32 and through the traction rollers 2 themselves which are in tight engagement with the traction ring 3 and the sun roller structure 1. The housing 4 has bearing support cavities 41 at one side receiving the bearing 24 for supporting one trunnion 22 of the traction roller 2 and it has an inner section 42 mounted on projections 43 extending through the spaces between the traction rollers 2.

The inner section 42 has openings 44 in axial alignment with the cavities 41 and receiving the bearing 23 for supporting the other trunnion 21 of the traction roller 2. The housing 4 preferably has an opening 45 covered by a removable lid 46 to provide easy access to the adjustment nut 16.

Figure 3:
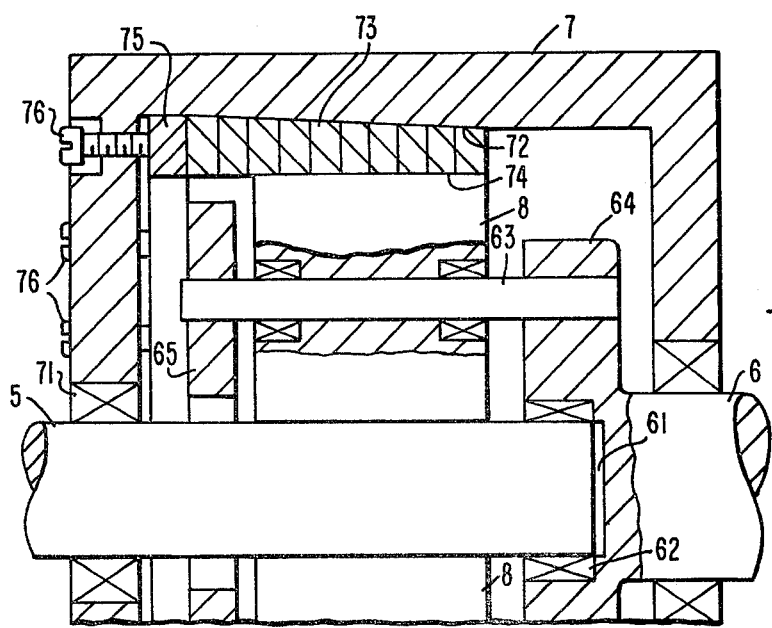
FIG. 3 is a cross-sectional view of another embodiment.

In an embodiment as shown in principle in FIG. 3, the adjustable coil spring structure is associated with the traction ring. Such an arrangement would be particularly desirable when the drive, and especially the sun roller, needs to be very small. FIG. 3 shows an arrangement with a stationary ring structure which, at the same time, forms the transmission housing. Here, a sun roller 5, which is the end of an input shaft, extends through a housing 7 into a cavity 61 in an output shaft 6 and is supported in the output shaft 6 by a bearing 62 and in the housing 7 by a bearing 71. The housing 7 has a tapered inner surface 72 which supports a coil spring 73 machined to have an outer tapered surface corresponding to tapered housing surface 72. The inner surface 74 of the coil spring is essentially cylindrical and forms an annular race concentric with but spaced from the sun roller 5. Traction rollers 8 are disposed in the annular space between the sun roller 5 and the race surface 74 and they are rotatably mounted on bearing shafts 63 extending from an output shaft flange 64. The free ends of the bearing shafts 63 may be supported by an interconnecting annular support ring 65. Adjacent the coil spring 73 there is a pressure ring 75, and adjustment screws 76 extend through the housing 7 and abut the pressure ring 75 so that the engagement of the traction rollers 8 with the sun roller 5 and the race surface 74 may be provided for by adjustment of the adjustment screws 76.

With this arrangement, assembly of the transmission is quite easy as the sun roller or ring structure may be expanded into engagement with the traction rollers only after the rollers are placed in position. It is also easily possible to adjust the engagement forces for wear after some time of operation, or to adjust the forces for different kinds of applications depending on the maximum amount of torque expected to be transmitted in the particular application. Finally, the traction surfaces formed by the outer or inner surfaces of the coiled steel spring are quite hard and wear resistant, and in any case they are easily replaceable.

The invention, however, is not limited to the arrangement as shown in the drawings. For each embodiment, the output shaft could be arranged at the same side of or opposite the input shaft.

Also, the input and output shafts may be associated with any of the sun roller structure, the traction roller support structure and the traction ring structure. It is also noted that a tapered coil spring may be associated with both the sun roller and traction ring structures. This provides not only for a greater adjustment range but also facilitates exchange of the traction surfaces when worn. The tapered coil spring will preferably have windings of essentially rectangular cross-section with rounded edges (as shown in FIG. 1), however, at least where they form the traction surface since this arrangement provides for grooves which reduce slip tendencies.

I claim:

1. A traction roller transmission comprising: a traction ring structure having an inner traction surface; a sun roller structure centrally disposed within said traction ring structure and having a circumferential traction surface spaced from the inner surface of said traction ring structure; planetary traction rollers supported in the space between, and in engagement with, the sun roller structure and the traction ring structure, at least one of said sun roller and said traction ring structures having a tapered support surface; a tightly coiled spring having a cylindrical traction surface and a tapered opposite surface disposed on said tapered support surface; and adjustment means for forcing said coiled cylindrical spring onto said tapered support surface to thereby force said coiled cylindrical spring against said traction rollers to cause firm engagement of said traction rollers with said sun roller and traction ring structures.

2. A traction roller transmission according to claim 1, wherein said sun roller structure has a tapered core and said coiled spring is tapered within and disposed on said tapered core, said tapered core being threaded at its narrow front end and said adjustment means being a lockable nut threaded onto the threaded front end of said tapered core.

3. A traction roller transmission according to claim 2, wherein said tightly coiled spring has windings of essentially rectangular cross-section and has a tapered inside opening machined to fit onto said tapered core.

4. A traction roller transmission according to claim 1, wherein said traction ring structure has a tapered inner support surface and said coiled spring has a cylindrical inner traction surface and a tapered outer surface machined to fit the tapered inner support surface of said traction ring structure and said adjustment means are set screws associated with said traction ring structure for forcing said coil spring into tighter engagement with said support surface.

5. A traction roller transmission according to claim 4, wherein said tightly coiled spring has windings of essentially rectangular cross-section.

6. A traction roller transmission according to claim 3 or claim 5, wherein the edges of the windings of said tightly coiled spring are slightly rounded so as to provide breaks in the contact areas between the rollers and the coiled spring surface adapted to receive lubricant squeezed from the contact areas.

* * * * *